United States Patent
Dalum et al.

(10) Patent No.: US 6,198,387 B1
(45) Date of Patent: Mar. 6, 2001

(54) RESTRAINT DEPLOYMENT CONTROL WITH CENTRAL AND FRONTAL CRASH SENSING

(75) Inventors: Joseph Thomas Dalum, Hartland, WI (US); Gerhard F. Wessels, Haan (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/404,176

(22) Filed: Sep. 24, 1999

Related U.S. Application Data

(63) Continuation-in-part of application No. 09/188,988, filed on Nov. 9, 1998, now Pat. No. 5,969,599.

(51) Int. Cl.$^7$ .................................................. B60Q 1/00
(52) U.S. Cl. ................ 340/436; 340/903; 307/10.1; 701/45; 280/735; 180/282
(58) Field of Search ..................... 340/436, 903, 340/435, 901, 904; 307/10.1; 701/45; 280/735; 180/282, 273

(56) References Cited

U.S. PATENT DOCUMENTS

| | | | |
|---|---|---|---|
| 5,424,583 | * 6/1995 | Spies et al. | 307/10.1 |
| 5,493,493 | * 2/1996 | Shibata et al. | 307/10.1 |
| 5,508,918 | * 4/1996 | Gioutsos | 340/436 |
| 5,737,224 | * 4/1998 | Jeenicke et al. | 307/10.1 |
| 5,777,225 | * 7/1998 | Sada et al. | 701/70 |
| 5,801,619 | * 9/1998 | Liu et al. | 340/436 |
| 5,802,480 | * 9/1998 | Shiraishi | 701/45 |
| 5,872,313 | 2/1999 | Zarabadi et al. | 73/497 |
| 5,884,203 | * 3/1999 | Ross | 701/45 |
| 5,889,207 | 3/1999 | Lutz | 73/504 |
| 5,969,599 | * 10/1999 | Wessels et al. | 340/436 |

FOREIGN PATENT DOCUMENTS 0836073   4/1998   (EP) .............................. G01C/19/56

* cited by examiner

*Primary Examiner*—Nina Tong
(74) *Attorney, Agent, or Firm*—Jimmy L. Funke

(57) ABSTRACT

An improved restraint deployment control with central and frontal acceleration sensing, where the deployment is initiated when a filtered version of the central acceleration signal exceeds a deployment threshold that is periodically adjusted based on secondary measures of crash severity, the secondary measures being determined at least from the frontal acceleration signal. The threshold adjustment also takes into account the progression level of the crash event, as judged by the filtered version of the central acceleration signal. In a preferred implementation, the deployment threshold is set to a relatively high default level during periods of inactivity to provide good immunity to rough road impacts, while providing timely deployment for high speed crash events, and is periodically adjusted from the default level in the course of a sensed event. Preferably, the level of event progression is determined by deriving a ΔV signal from the central acceleration sensor, and comparing such signal to a set of predefined event progression thresholds. At each level or stage of the event progression, the deployment threshold is adjusted within predefined boundaries based on central and frontal crash severity indications. Threshold adjustments based on the central and frontal severity indications are individually limited and then accumulated to determine the net threshold adjustment. In a particularly advantageous embodiment, the secondary measurements include an offset measure based on the difference between two frontal ΔV signals, and corner crush measures based on differences between the frontal and central ΔV signals.

14 Claims, 4 Drawing Sheets

RESTRAINT DEPLOYMENT CONTROL WITH CENTRAL AND FRONTAL CRASH SENSING

RELATED INVENTIONS

This is a continuation-in-part of U.S. patent application Ser. No. 09/188,988, filed Nov. 9, 1998, now U.S. Pat. No. 5,969,599 and assigned to the assignee of the present invention.

TECHNICAL FIELD

This invention relates to automotive passenger restraint systems, and more particularly to a control method that differentiates deployment events from non-deployment events in a restraint system having both central and frontal crash sensors.

BACKGROUND OF THE INVENTION

In general, automotive passenger restraint systems perform a number of functions including acceleration sensing, signal processing and analysis, and deployment of one or more restraint devices such as frontal or side air bags and seat belt pretensioners in response to a sensed crash event. Typically, an acceleration signal is monitored to detect a potential crash event, and then filtered or integrated over the course of the crash event to produce a velocity change or $\Delta V$ signal. If the $\Delta V$ signal exceeds a threshold, the crash event is determined to be sufficiently severe to warrant deployment of restraints. The threshold is typically time-dependent, and is calibrated based on data logged for different types of crash events, as well as data logged during rough road driving. Multiple distributed crash sensors are sometimes used in order to obtain faster deployment decisions and to distinguish a localized crash event from a full frontal crash event. For example, the system may include a central crash sensor located in or near the passenger compartment and one or more remote sensors located near the front corners of the vehicle.

A problem with the above-described approach, with single or multiple sensors, is that it is often difficult to synchronize the time progression of the crash (that is, the event clock or timer) with the actual crash event. Various algorithms have been developed for determining if and when the event clock should be reset to improve synchronization. As a result, it can be difficult to distinguish between deployment events and non-deployment events, particularly in the first portion of the sensed event.

A related problem in systems with multiple crash sensors is that it is difficult to quickly and reliably correlate the information from the various sensors. In particular, it is difficult to reliably distinguish between a localized crash event for which deployment is desired and a localized impact (such as a deer impact or an abuse event) for which deployment is not desired.

SUMMARY OF THE INVENTION

The present invention is directed to an improved restraint deployment control with central and frontal acceleration sensing, where the deployment is initiated when a filtered version of the central acceleration signal exceeds a deployment threshold that is periodically adjusted based on secondary measures of crash severity, the secondary measures being determined at least from the frontal acceleration signal. The threshold adjustment also takes into account the progression level of the crash event, as judged by the filtered version of the central acceleration signal.

In a preferred embodiment, the deployment threshold is set to a relatively high default level during periods of inactivity to provide good immunity to rough road impacts, while providing timely deployment for high speed crash events, and is periodically adjusted from the default level in the course of a sensed event. Preferably, the level of event progression is determined by deriving a $\Delta V$ signal from the central acceleration sensor, and comparing such signal to a set of predefined event progression thresholds. At each level or stage of the event progression, the deployment threshold is adjusted within predefined boundaries based on central and frontal crash severity indications. Threshold adjustments based on the central and frontal severity indications are individually limited and then accumulated to determine the net threshold adjustment. In a particularly advantageous embodiment, the secondary measurements include an offset measure based on the difference between two frontal $\Delta V$ signals, and corner crush measures based on differences between the frontal and central $\Delta V$ signals.

BRIEF DESCRIPTION OF THE DRAWINGS

FIG. 4 is a main flow diagram, and FIG. 5 details a step of the main flow diagram relating to determination of a threshold adaptation amount.

DESCRIPTION OF THE PREFERRED EMBODIMENT

Figure 1:
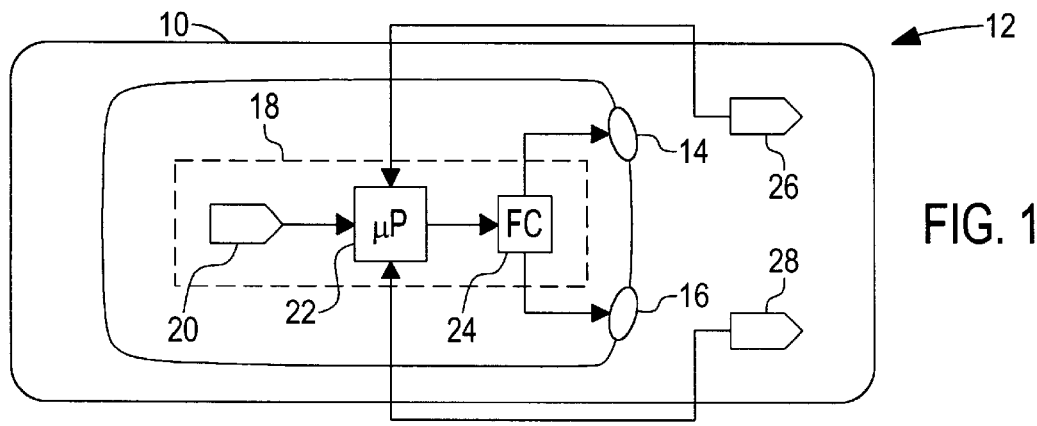
FIG. 1 is a schematic diagram of a supplemental restraint system including central and frontal acceleration sensing and a programmed microprocessor for carrying out the deployment method of this invention.

FIG. 1 generally depicts a vehicle 10 equipped with a supplemental restraint system 12 in which frontal air bags 14, 16, are deployed in a severe crash event to protect the vehicle occupants. The system 12 may include other restraints such as side air bags, belt pretensioners, inflatable tubular structures, side curtains, anti-whiplash devices, and so on, and it will be understood that the term "air bag" as used herein does not refer exclusively to a particular type of restraint. Restraint system 12 includes a central control module 18, which may be packaged as a single electronic module and mounted on a frame element in a central portion of the vehicle 10. Fundamentally, the central control module 18 includes a longitudinal acceleration sensor 20 (which may comprise a single sensor or a pair of sensors mounted at an offset angle) for sensing longitudinal acceleration of the vehicle 10, a microprocessor ($\mu$P) 22 for receiving a central acceleration signal developed by the sensor 20, and a firing circuit (FC) 24 which is triggered by microprocessor 22 to deploy the air bags 14, 16 in the event of a severe crash. The microprocessor 22 also receives left and right frontal acceleration signals developed by the acceleration sensors 26 and 28, respectively, which are located in a crush zone near the frontal periphery of the vehicle 12.

In general, the microprocessor 22 of the central control module 18 filters the central acceleration signal over a predefined interval, or window, to form a windowed velocity signal, referred to herein as $\Delta V_{WIN}$, and adjusts a deployment threshold, referred to herein as the ΔV Threshold, based on crash event progression, and various secondary crash severity indications obtained from the central and frontal acceleration signals. The windowed velocity signal $\Delta V_{WIN}$ is compared to the ΔV Threshold, and the microprocessor 22 signals the firing circuit 24 to deploy the air bags 14, 16 if and when $\Delta V_{WIN}$ crosses the ΔV Threshold. Preferably, the ΔV Threshold is set at a default level prior to initiation of a crash event and is periodically adjusted during the crash event. The progression of the crash event is determined by a ΔV signal derived from the central acceleration signal, and the secondary measures are designed to identify the characteristics of various types of crash events so that the ΔV Threshold can be adjusted accordingly.

The windowed velocity signal $\Delta V_{WIN}$ may be calculated according to the expression:

$$\Delta V_{WIN}(n) = \Sigma[ACCEL(n-i)], \text{ for } i=0 \text{ to } (w-1) \quad (1)$$

where ACCEL is a filtered version of the central acceleration signal and w is the window size. In a digital implementation, the window w actually refers to a specified number of successive samples of the central acceleration signal. Since the samples are read at a predefined rate, however, the window w also may be viewed as a corresponding time interval.

In the preferred embodiment, the level of event progression is determined by computing a velocity signal $\Delta V_{bias}$ that is biased toward zero. The biased velocity signal $\Delta V_{bias}$ may be determined by computing a filtered central acceleration signal $\Delta V_c$, and then applying a bias "B". For example, $\Delta V_c$ may be calculated according to the expression:

$$\Delta V_c(n) = \Delta V_c(n-1) + ACCEL(n) - \Delta V_c(n-1)/C \quad (2)$$

where C is a constant, with $\Delta V_{bias}$ being defined as:

$$\Delta V_{bias} = \Delta V_c - B \quad (3)$$

and the bias B being defined as:

d if $\Delta V_c > d$, with d being a positive integer $$B = \Delta V_c \text{ if } |\Delta V_c| \leq d \quad (4)$$

−d if $\Delta V_c < -d$

Figure 2:
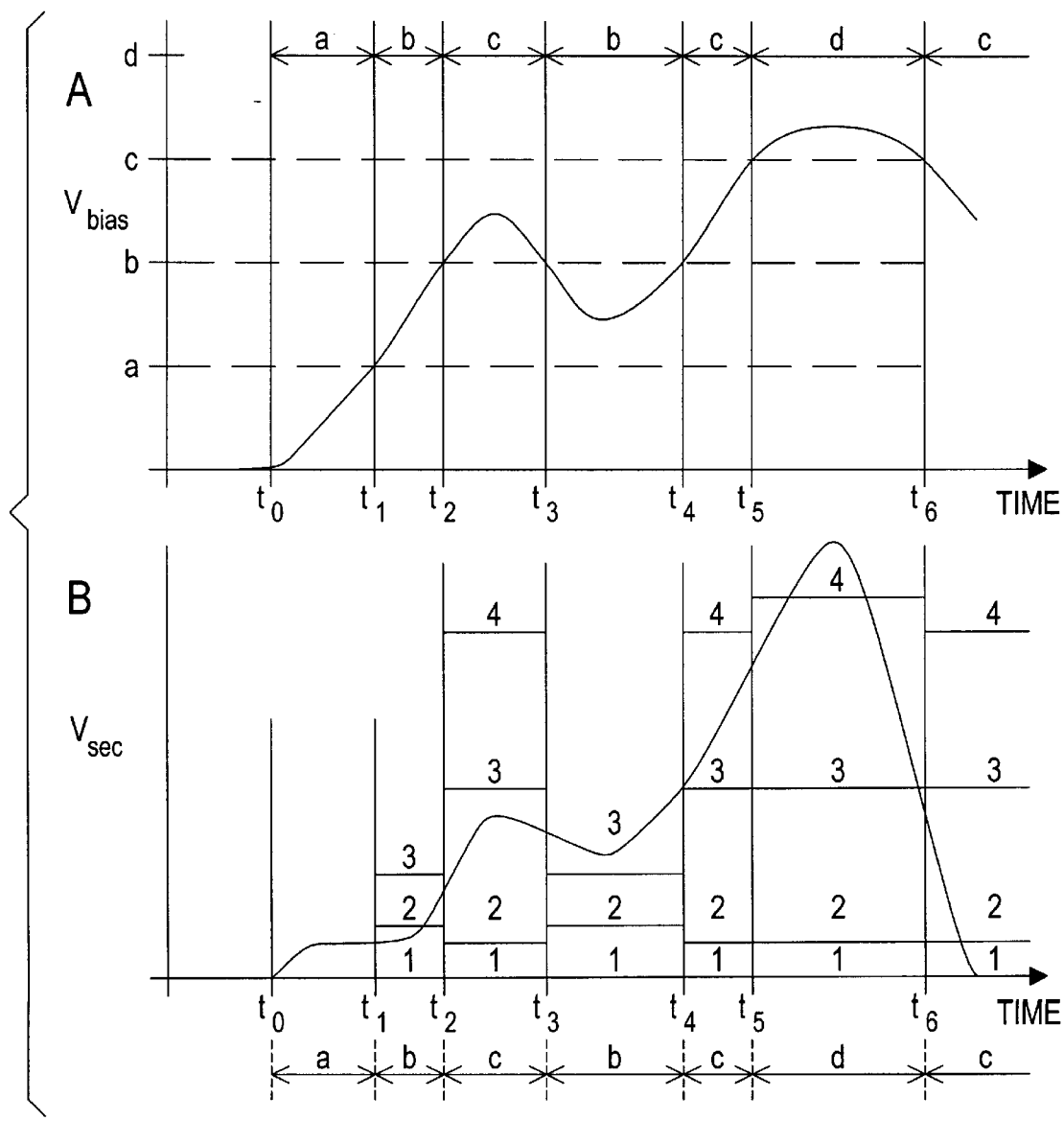
FIG. 2 is a graphical representation of event progression determination and threshold modification according to this invention.

Alternatively, the level of event progression can be determined by using windowed velocity $\Delta V_{WIN}$ within a limited acceleration range, or a filtered version of $\Delta V_{WIN}$ or $\Delta V_c$. For purposes of this description, however, it will be assumed that $\Delta V_{bias}$ is used to determine the level of event progression. To this end, $\Delta V_{bias}$ is compared to a series of predefined velocity values, referred to herein as progression level thresholds a–d, thereby defining four corresponding stages or levels of event progression; obviously, the number of thresholds, and hence progression levels, may vary from one implementation to another. The approach is graphically depicted in FIG. 2, where Graphs A and B show exemplary values of $\Delta V_{bias}$ and a secondary measurement term $\Delta V_{sec}$ respectively, on a common time scale. The time designations $t_0$–$t_6$ signify times that coincide with $\Delta V_{bias}$ crossing one of the thresholds a–d, and the event progression level at any given time is indicated at the top of Graph A, and below the time axis of Graph B. For example, progression level of the sensed event is "a" in the time interval $t_0$–$t_1$, "b" in the time interval $t_1$–$t_2$, "c" in the time interval $t_2$–$t_3$, "b" in the time interval $t_3$–$t_4$, and so on. The progression level "a" is indicative of no or very low activity. For each secondary measure $\Delta V_{sec}$, each of the progression levels a–d have predefined regions corresponding to different levels of the secondary measure, as shown by the vertical columns in Graph B, and the threshold adjustment amount is determined based on which region the secondary signal is in. For example, if the sensed event in is progression level "b", a set of threshold adjustment rules might be: (1) increase the ΔV Threshold by 5 counts if $\Delta V_{sec}$ is in region 1, (2) increase the ΔV Threshold by 1 count if $\Delta V_{sec}$ is in region 2, and (3) decrease the ΔV Threshold by 2 counts if $\Delta V_{sec}$ is in region 3.

The usefulness of the above-described threshold adjustment technique can be illustrated by considering an example. Suppose it is determined through review of crash data that a certain type of non-deployment event such as a localized frontal impact (with a deer, for example) is characterized by high gradient of $\Delta V_{bias}$ at early and middle levels of the event progression. In such case, the progression levels a–d and the associated regions of secondary measurement representing high gradient of $\Delta V_{bias}$ can be determined by statistical analysis, and used to formulate rules such as described above to raise the ΔV Threshold when the event progression level and secondary measurement characteristics are recognized in the course of a crash event so as to reduce the likelihood of an unwanted deployment. As a practical matter, there may be several secondary measurements, based on the longitudinal acceleration signal ACCEL, or on signals from other sensors such as a lateral acceleration sensor, a remote longitudinal acceleration sensor, or an intrusion sensor. In any event, the threshold adjustments associated with each such secondary measurement are summed to form a net adjustment value. If desired, weighting may be used to give more effect to adjustments associated with secondary measurement characteristics that are easily recognized, as compared to characteristics that tend to be variable and are less easily recognized.

In a particularly advantageous embodiment, the secondary measurements include differential measures that combine the ΔV information obtained from different acceleration sensors. These include an offset measure OM and left and right crush measures LC and RC. The offset measure OM is based on the difference in ΔV signals obtained from the left and right frontal acceleration signals. That is:

$$OM = |\Delta V_L - \Delta V_R| \quad (5)$$

where $\Delta V_L$ is a filtered version of the left frontal acceleration signal, and $\Delta V_R$ is a filtered version of the right frontal acceleration signal. The left and right crush measures LC, RC are based on the differences between the individual frontal ΔV signals and $\Delta V_c$. Thus, the measures LC and RC are given by the expressions:

$$LC = |\Delta V_L - \Delta V_c|, \quad (6)$$

and $$RC = |\Delta V_R - \Delta V_c|. \quad (7)$$

Figure 3:
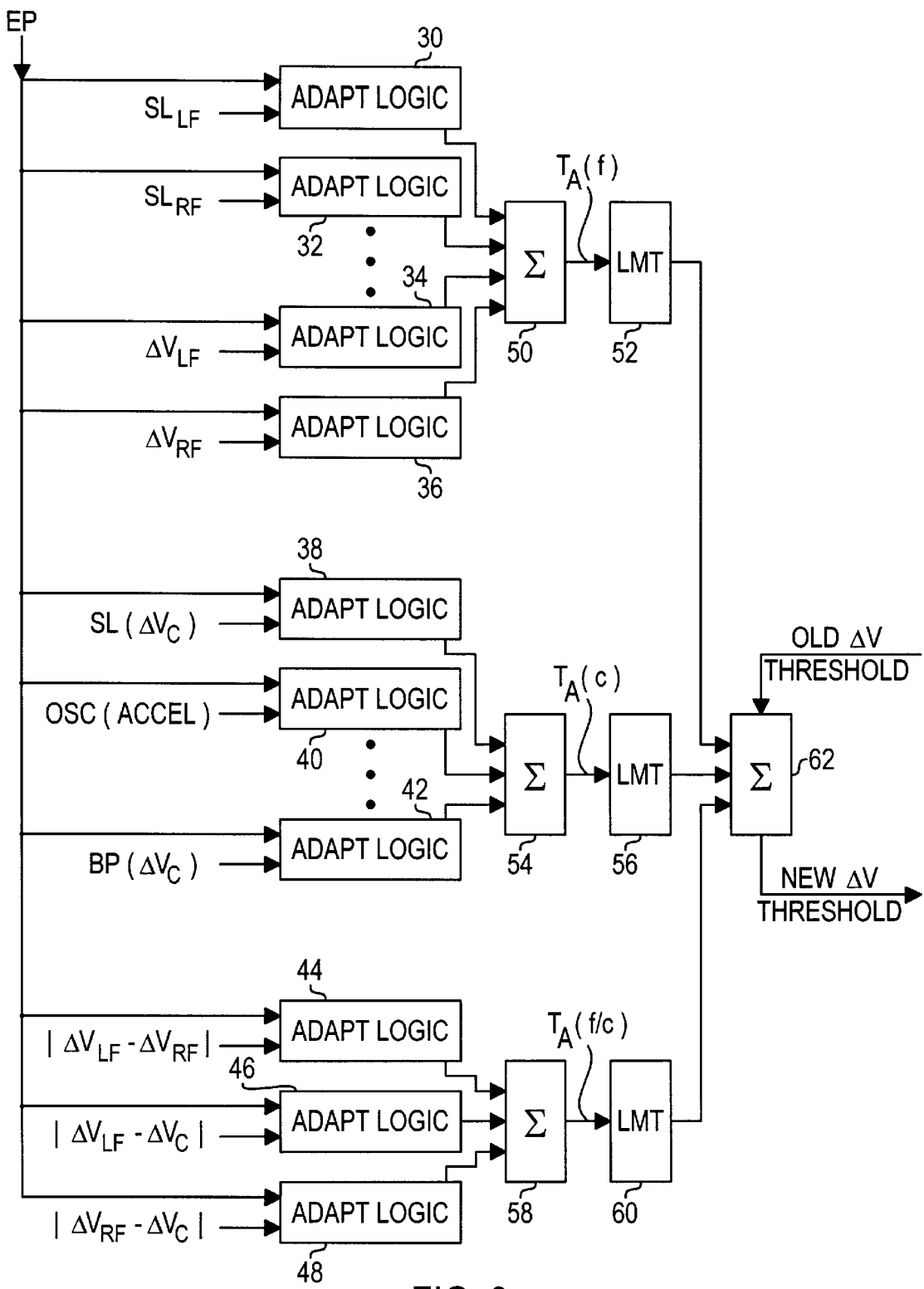
FIG. 3 is a diagram illustrating deployment threshold adjustment according to this invention.

FIG. 3 is a diagram illustrating an exemplary adjustment of the ΔV Threshold. In the diagram, individual secondary measures of severity developed from the various acceleration sensors 20, 26, 28 are applied along with an event progression (EP) signal to Adaptation Logic blocks 30–48. For each secondary measure, the respective Adaptation Logic block 30–48 implements adaptation rules similar to those described above in reference to FIG. 2. The secondary measures applied to Adaptation Logic blocks 30, 32, 34, 36 are developed based on the frontal sensors 26, 28 and the adaptation amounts developed by such blocks are summed by the summer 50 to form a frontal adaptation amount $T_A(f)$, and limited to a frontal adaptation limit amount by the limit block 52. Similarly, the secondary measures applied to Adaptation Logic blocks 38, 40, 42 are developed based on the central sensor 20 and the adaptation amounts developed by such blocks are summed by the summer 54 to form a central adaptation amount $T_A(c)$, and limited to a central adaptation limit amount by the limit block 56. And finally, the secondary measures applied to Adaptation Logic blocks 44, 46, 48 are developed based on the various combinations of the central and frontal sensors 20, 26, 28, and the adaptation amounts developed by such blocks are summed by the summer 58 to form a frontal/central adaptation amount $T_A(f/c)$, and limited to a central/frontal adaptation limit amount by the limit block 60. The summed and limited adaptation amounts from summers 52, 56, 60 are then summed in summer 62, along with the old $\Delta V$ Threshold, forming the new $\Delta V$ Threshold.

The secondary measures indicated in the diagram of FIG. 3 are exemplary and non-exhaustive, as indicated by the dot trails between blocks 32, 34 and 40, 42. The illustrated frontal secondary measures include the slope (SL) of signals developed from the frontal sensors 26, 28, and $\Delta V$ signals developed from the frontal sensors 26, 28. The illustrated central secondary measures include the slope (SL) of $\Delta V_c$, the oscillation (OSC) of ACCEL, and a band-pass (BP) filtered version of $\Delta V_c$. The illustrated combined secondary measures include the offset measure OM described above in reference to equation 5, and the left and right crush measures LC, RC described above in reference to equations 6, 7.

Figure 4:
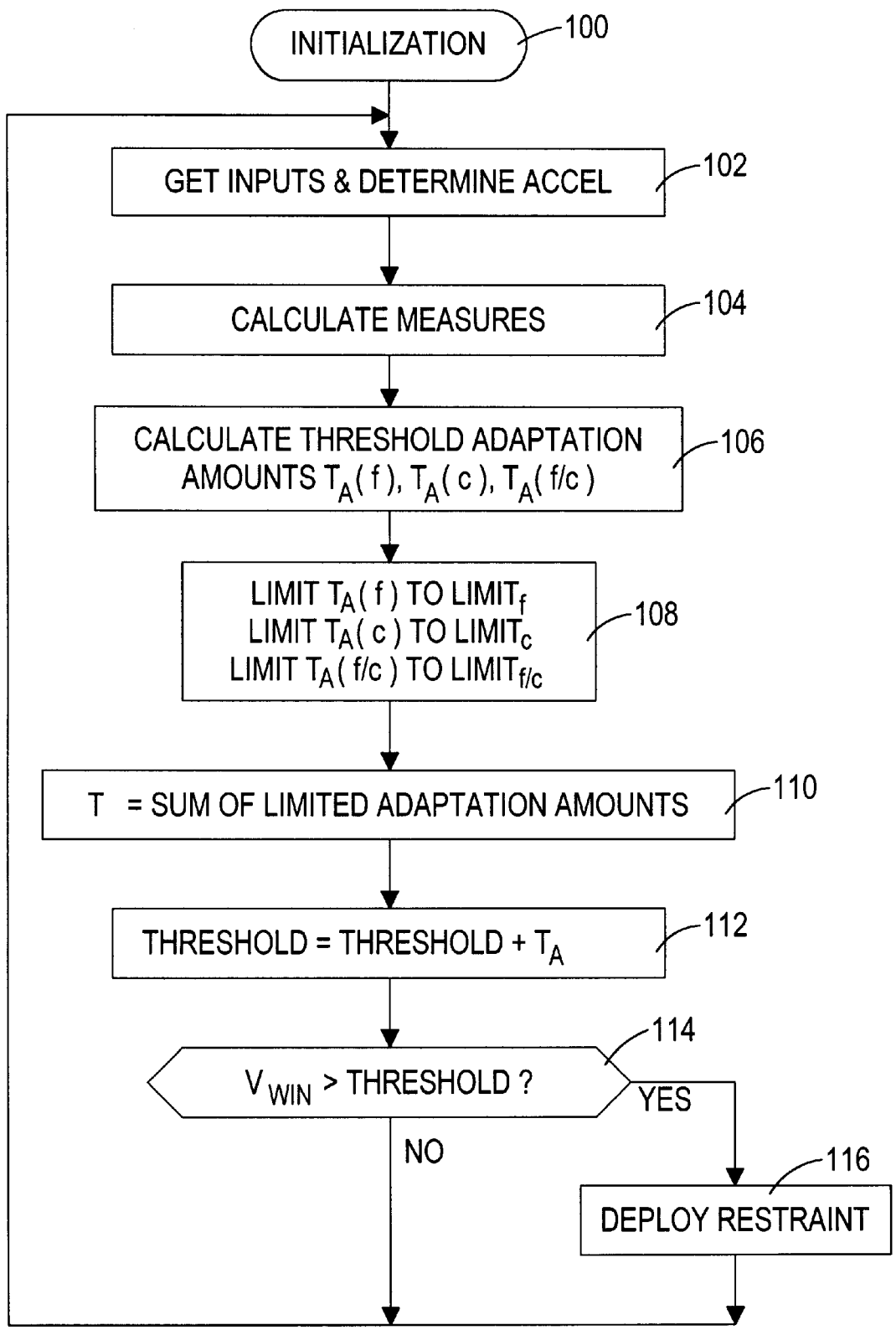
FIGS. 4–5 are flow diagrams representative of computer program instructions executed by the microprocessor of FIG. 1 in carrying out the deployment method of this invention.
Figure 5:
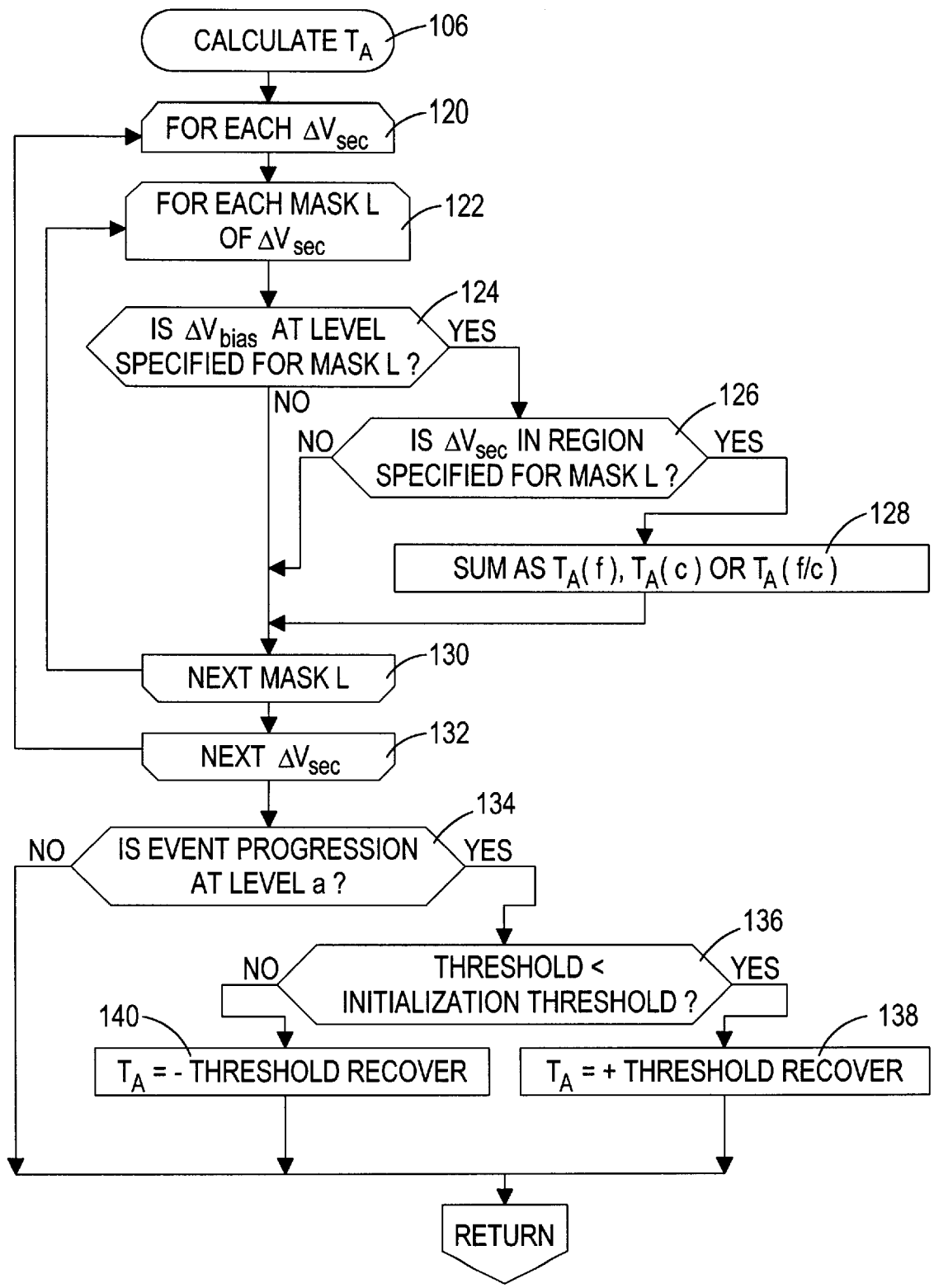

A flow diagram representative of computer program instructions executed by the microprocessor $\mu P$ of FIG. 1 in carrying out the above-described deployment method is set forth in FIGS. 4–5. FIG. 4 depicts a main loop flow diagram, where the block 100 designates a series of instructions executed at the initiation of vehicle operation for initializing various registers, counters, flags and variables to a pre-defined state. For example, the $\Delta V$ Threshold is initialized to a default value at this point. Thereafter, the block 102 is executed to read the output signal of the longitudinal acceleration sensor LAS, and to filter it to form a filtered acceleration signal ACCEL. The various severity measurements are then computed at block 104; these include, for example, $\Delta V$, $\Delta V_{bias}$, $\Delta V_{win}$, $V_{sec1}$, $V_{sec2}$ and so on, where $V_{sec1}$ and $V_{sec2}$ are secondary measurements such as OM, LC, RC, and so on. Block 106 is then executed to calculate frontal, central and frontal/cental threshold adaptation amounts $T_A(f)$, $T_A(C)$, $T_A(f/c)$ as described above in reference to FIG. 3. Block 108 then limits the adaptation amounts $T_A(f)$, $T_A(c)$, $T_A(f/c)$ to respective limit values $LIMIT_f$, $LIMIT_c$, $LIMIT_{f/c}$, also as described above in reference to FIG. 3. The block 110 then sets the total adaptation amount $T_A$ to the sum of the limited frontal, central and frontal/central adaptation amounts, and block 112 sums $T_A$ with the old $\Delta V$ Threshold to form the new $\Delta V$ Threshold. If the windowed velocity $\Delta V_{win}$ exceeds the newly adjusted threshold, as determined at block 114, the block 116 is executed to deploy the restraints AB.

The flow diagram of FIG. 5 sets forth the main flow diagram step of determining the net threshold adaptation amounts $T_A$ (block 106) in further detail. In the illustrated embodiment, the various event progression thresholds a–d, the regions 1–4 for each secondary measurement, and the associated threshold adjustment amounts are stored in an adaptation matrix within microprocessor $\mu P$, and a series of progression level masks for each secondary measurement are used to identify corresponding regions and adjustment amounts. Blocks 120–132 comprise a nested loop for determining the net frontal, central and frontal/central adaptation amounts $T_A(f)$, $T_A(c)$, $T_A(f/c)$, taking into account each of the secondary measurements. Thus, for each secondary measurement $\Delta V_{sec}$, the microprocessor $\mu P$ executes the blocks 122–130 within the $\Delta V_{sec}$ loop boundary blocks 120 and 132, and for each progression level mask L, the microprocessor $\mu P$ executes the blocks 124–128 within the progression level loop boundary blocks 122 and 130. At block 124, the current mask L is applied to the matrix, and the microprocessor $\mu P$ determines if the biased velocity $\Delta V_{bias}$ is within the corresponding progression level thresholds. If not, the mask L for the next progression level is applied to the matrix, as indicated at block 130. If $\Delta V_{bias}$ is within the corresponding progression level thresholds, block 126 determines if the respective secondary measurement $\Delta V_{sec}$ is within an adaptation region corresponding to the progression level of the mask L, and if so, block 128 sums the corresponding adaptation values to form the net threshold adaptation amounts $T_A(f)$, $T_A(c)$ and $T_A(f/c)$. In other words, the adaptation values derived from the frontal sensors 26, 28 are summed to form $T_A(f)$, the adaptation values derived from the central sensor 20 are summed to form $T_A(c)$, and the adaptation values derived from the combined outputs of the central and frontal sensors 20, 26, 28 are summed to form $T_A(f/c)$. As described above in reference to FIG. 2, the various adaptation values are stored in the matrix as a function of the secondary measurement $\Delta V_{sec}$ and the progression level mask L.

After the net threshold adaptation amounts are determined for each progression level mask L of each secondary measurement $\Delta V_{sec}$, the blocks 134–138 are executed to bias the $\Delta V$ Threshold toward its default value (initialization threshold) if the event progression level is "a"—i.e., no activity. Block 134 determines if the event progression is at level "a". If so, block 136 compares the $\Delta V$ Threshold to the Initialization Threshold. If the $\Delta V$ Threshold has been adjusted to a value less than the Initialization Threshold, block 138 sets the net threshold adaptation amount $T_A$ to a positive incremental value, referred to in FIG. 5 as +Threshold Recover. Conversely, if the $\Delta V$ Threshold has been adjusted to a value greater than the Initialization Threshold, block 138 sets the net threshold adaptation amount $T_A$ to a negative incremental value, referred to in FIG. 5 as −Threshold Recover.

In summary, the deployment method of this invention provides a flexible framework for providing a high level of immunity to spurious acceleration signals and distinguishing between deployment events and non-deployment events based on the outputs of both central and remote sensors. The statistical frequency of various secondary measurements for different types of crash events (i.e., deployment, non-deployment, rough road, etc.) can be characterized as a function of $\Delta V$-based event progression level, and used to suitably adjust the $\Delta V$ Threshold to increase or decrease the likelihood of deployment in the course of a crash event. When the crash event is over, the threshold is biased back to an initialization or default level providing the desired immunity to spurious events. While described in reference to the illustrated embodiment, it is expected that various modifications in addition to those suggested above will occur to those skilled in the art. For example, secondary measures based on other remote acceleration sensors, such as side or rear acceleration sensors, may be easily incorporated in a manner similar to that described with respect to the frontal sensors 26, 28. In this regard, it will be understood that this invention is not limited to the illustrated embodiment, and that deployment methods incorporating these and other modifications may fall within the scope of this invention, which is defined by the appended claims.

What is claimed is:

1. A deployment control for a vehicular supplemental restraint, including a central sensor disposed in a central vehicle location providing a central acceleration signal, at least one remote sensor disposed in a peripheral vehicle location providing a peripheral acceleration signal, and a controller for deploying the restraint in a crash event based on said central and peripheral acceleration signals, the improvement wherein the controller:

initializes a deployment threshold at a default level prior to the crash event;

determines an event progression signal during the crash event based on the central acceleration signal;

determines at least one secondary measure of crash severity during the crash event based on the peripheral acceleration signal;

determines a threshold adjustment amount based on the determined secondary measure and the event progression signal;

periodically adjusts the deployment threshold in accordance with the threshold adjustment amount; and deploys the restraint when a measure of crash severity based on the central acceleration signal exceeds the deployment threshold.

2. The improvement of claim 1, wherein the controller limits the threshold adjustment amount to a predetermined limit value prior to adjusting the deployment threshold.

3. The improvement of claim 1, wherein the at least one secondary measure of crash severity is a crush measure determined by filtering said central and peripheral acceleration signals to form first and second $\Delta$ velocity signals, and calculating a difference between said first and second $\Delta$ velocity signals.

4. The improvement of claim 3, wherein the at least one remote sensor is a frontal acceleration sensor disposed in a frontal vehicle location.

5. The improvement of claim 1, wherein the deployment control includes first and second remote sensors providing first and second peripheral acceleration signals and the at least one secondary measure of crash severity is an offset measure determined by filtering said first and second peripheral acceleration signals to form first and second $\Delta$ velocity signals, and calculating a difference between said first and second $\Delta$ velocity signals.

6. The improvement of claim 5, wherein the first and second remote sensors are frontal acceleration sensors disposed in left and right frontal vehicle locations.

7. The improvement of claim 1, wherein there are a plurality of secondary measures of crash severity, and the controller:

sums threshold adjustment amounts for each of the plurality of secondary measures to form a net threshold adjustment amount;

limits the net threshold adjustment amount to a predefined limit value; and adjusts the deployment threshold in accordance with the limited net threshold adjustment amount.

8. A control method for a vehicular supplemental restraint having a central sensor disposed in a central vehicle location providing a central acceleration signal, at least one remote sensor disposed in a peripheral vehicle location providing a peripheral acceleration signal, and a controller for deploying the restraint in a crash event based on said central and peripheral acceleration signals, the method comprising the steps of:

initializing a deployment threshold at a default level prior to the crash event;

determining an event progression signal during the crash event based on the central acceleration signal;

determining at least one secondary measure of crash severity during the crash event based on the peripheral acceleration signal;

determining a threshold adjustment amount based on the determined secondary measure and the event progression signal;

periodically adjusting the deployment threshold in accordance with the threshold adjustment amount; and deploying the restraint when a measure of crash severity based on the central acceleration signal exceeds the deployment threshold.

9. The control method of claim 8, including the step of:
   limiting the threshold adjustment amount to a predetermined limit value prior to adjusting the deployment threshold.

10. The control method of claim 8, wherein the at least one secondary measure of crash severity is a crush measure determined by filtering said central and peripheral acceleration signals to form first and second $\Delta$ velocity signals, and calculating a difference between said first and second $\Delta$ velocity signals.

11. The control method of claim 10, wherein the at least one remote sensor is a frontal acceleration sensor disposed in a frontal vehicle location.

12. The control method of claim 8, including first and second remote sensors providing first and second peripheral acceleration signals, wherein the at least one secondary measure of crash severity is an offset measure determined by filtering said first and second peripheral acceleration signals to form first and second $\Delta$ velocity signals, and calculating a difference between said first and second $\Delta$ velocity signals.

13. The control method of claim 12, wherein the first and second remote sensors are frontal acceleration sensors disposed in left and right frontal vehicle locations.

14. The control method of claim 8, wherein there are a plurality of secondary measures of crash severity, and the control method includes the steps of:

summing threshold adjustment amounts for each of the plurality of secondary measures to form a net threshold adjustment amount;

limiting the net threshold adjustment amount to a predefined limit value; and adjusting the deployment threshold in accordance with the limited net threshold adjustment amount.

\* \* \* \* \*